United States Patent
Andretich

(10) Patent No.: US 9,573,510 B2
(45) Date of Patent: Feb. 21, 2017

(54) MOBILE STRUCTURE HAVING SUFFICIENT INTERNAL STRUCTURAL RIGIDITY TO ELIMINATE LOAD-BEARING PERIMETER SUPPORT STRUCTURES

(71) Applicant: Micah F. Andretich, Santa Rosa, CA (US)

(72) Inventor: Micah F. Andretich, Santa Rosa, CA (US)

( * ) Notice: Subject to any disclaimer, the term of this patent is extended or adjusted under 35 U.S.C. 154(b) by 0 days.

(21) Appl. No.: 14/854,018

(22) Filed: Sep. 14, 2015

(65) Prior Publication Data

US 2016/0001691 A1     Jan. 7, 2016

Related U.S. Application Data

(63) Continuation of application No. 14/148,688, filed on Jan. 6, 2014, now Pat. No. 9,132,764.

(51) Int. Cl.
| | |
|---|---|
| B60P 3/00 | (2006.01) |
| F24J 2/52 | (2006.01) |
| H01L 31/042 | (2014.01) |
| B62D 21/00 | (2006.01) |
| B62D 25/06 | (2006.01) |
| B62D 63/08 | (2006.01) |
| H02S 10/40 | (2014.01) |
| H02S 30/20 | (2014.01) |
| H02S 20/10 | (2014.01) |
| F24J 2/54 | (2006.01) |

(52) U.S. Cl.
CPC ............ *B60P 3/00* (2013.01); *B62D 21/00* (2013.01); *B62D 25/06* (2013.01); *B62D 63/08* (2013.01); *F24J 2/5264* (2013.01); *H02S 10/40* (2014.12); *H02S 20/00* (2013.01); *H02S 20/10* (2014.12); *H02S 30/20* (2014.12); *F24J 2/541* (2013.01); *Y02B 10/12* (2013.01); *Y02B 10/20* (2013.01); *Y02E 10/47* (2013.01); *Y02E 10/50* (2013.01)

(58) Field of Classification Search
CPC ............ E04D 13/1625; E04B 2001/249; E04B 7/024; E04B 2001/2415; Y02B 10/12; H01L 2924/00; H01L 2224/743; H04Q 11/0478; C12Q 1/6811; G06F 5/14
USPC ........... 296/24.3, 168, 210, 187.12; 180/281, 180/311, 89.1; 52/653; 248/237, 48.1
See application file for complete search history.

(56) References Cited

U.S. PATENT DOCUMENTS

| | | | | |
|---|---|---|---|---|
| 2,233,181 A | * | 2/1941 | Quartullo | B62D 33/04 296/25 |
| 2,678,442 A | * | 5/1954 | Ensor | B60P 3/34 296/173 |

(Continued)

*Primary Examiner* — Kiran B Patel
(74) *Attorney, Agent, or Firm* — Russ Weinzimmer & Associates, PC

(57) ABSTRACT

A mobile structure includes first and second rigid frames and first and second horizontal roof supports supported by the rigid frame. Each of the rigid frames includes a first vertical support, a second vertical support substantially parallel to the first vertical support, and a lateral rigid frame support extending perpendicularly at least from the first vertical support to the second vertical support. The mobile structure further includes a floor under the first and second horizontal roof supports, a wheel-axle assembly under the floor, and leveling assemblies that are extendable away from the floor. Each leveling assembly is in weight-bearing and in-line relationship with respect to one of the vertical supports of the first rigid frame.

5 Claims, 3 Drawing Sheets

(56) References Cited

U.S. PATENT DOCUMENTS

| | | | | |
|---|---|---|---|---|
| 2,896,996 A * | 7/1959 | Atwater | A01K 31/002 | 296/3 |
| 3,633,963 A * | 1/1972 | Haynes | B62D 33/042 | 119/401 |
| 3,999,775 A * | 12/1976 | Brongo | B62B 3/003 | 211/187 |
| 4,055,206 A * | 10/1977 | Griffin | B25H 1/12 | 144/1.1 |
| 4,149,748 A * | 4/1979 | Tanner | B60S 9/08 | 280/789 |
| 4,214,555 A * | 7/1980 | Sawby | A61D 3/00 | 119/723 |
| 4,526,548 A * | 7/1985 | Livingston | A62C 99/0081 | 434/226 |
| 4,836,395 A * | 6/1989 | Goutille | B65D 88/121 | 220/1.5 |
| 5,173,052 A * | 12/1992 | Duncan, Jr. | A62C 99/0081 | 296/168 |
| 5,174,622 A * | 12/1992 | Gutta | B60J 5/0487 | 180/210 |
| 5,203,601 A * | 4/1993 | Guillot | B62D 21/183 | 296/102 |
| 5,297,844 A * | 3/1994 | Haustein | B62D 33/044 | 182/116 |
| 5,658,037 A * | 8/1997 | Evans | B60J 7/085 | 160/122 |
| 5,833,294 A * | 11/1998 | Williams | B60S 5/00 | 296/24.32 |
| 5,833,295 A * | 11/1998 | Farlow, Jr. | B60P 3/14 | 296/22 |
| 5,890,453 A * | 4/1999 | Waring-Brown | A01K 1/0236 | 119/400 |
| 5,918,924 A * | 7/1999 | Cowan | B60R 13/00 | 296/21 |
| 6,105,721 A * | 8/2000 | Haynes | A01M 31/025 | 182/116 |
| 6,302,475 B1 * | 10/2001 | Anderson | B60P 3/34 | 296/175 |
| 6,434,895 B1 * | 8/2002 | Hosterman | B60P 3/34 | 52/143 |
| 6,439,825 B1 * | 8/2002 | Bonsall | B60P 3/04 | 119/400 |
| 6,729,678 B1 * | 5/2004 | Atcravi | B60P 3/34 | 296/165 |
| 7,134,444 B2 * | 11/2006 | Mintie | B08B 15/00 | 135/131 |
| 7,144,020 B2 * | 12/2006 | Huguet | A47B 95/043 | 280/47.34 |
| 7,191,567 B2 * | 3/2007 | Brandt | E04B 5/12 | 280/789 |
| 7,195,076 B2 * | 3/2007 | De Vor | A01K 1/0613 | 119/516 |
| 7,273,019 B2 * | 9/2007 | Towley, III | B63C 13/00 | 114/344 |
| 7,296,808 B2 * | 11/2007 | Huguet | A47B 95/043 | 280/47.34 |
| 7,455,026 B2 * | 11/2008 | Towley, III | B63C 13/00 | 114/263 |
| 7,503,607 B2 * | 3/2009 | Sersland | A01M 31/02 | 296/190.04 |
| 7,591,497 B2 * | 9/2009 | Johns | B60P 3/14 | 280/35 |
| 7,712,813 B2 * | 5/2010 | Di Franco | B62D 63/061 | 296/171 |
| 7,789,452 B2 * | 9/2010 | Dempsey | B60P 3/341 | 296/169 |
| 7,795,837 B1 * | 9/2010 | Haun | H01M 10/441 | 136/244 |
| 7,810,866 B2 * | 10/2010 | Dempsey | B60P 3/341 | 296/169 |
| 2011/0016803 A1 * | 1/2011 | Ray | E04D 3/3608 | 52/90.2 |

\* cited by examiner

MOBILE STRUCTURE HAVING SUFFICIENT INTERNAL STRUCTURAL RIGIDITY TO ELIMINATE LOAD-BEARING PERIMETER SUPPORT STRUCTURES

CROSS-REFERENCE TO RELATED APPLICATIONS

The present application claims the benefit of and priority to U.S. patent application Ser. No. 14/148,688 titled "A MOBILE STRUCTURE HAVING SUFFICIENT INTERNAL STRUCTURAL RIGIDITY TO ELIMINATE LOAD-BEARING PERIMETER SUPPORT STRUCTURES," filed Jan. 6, 2014, which application is fully incorporated herein in its entirety by this reference, which claims the benefit of and priority to U.S. patent application Ser. No. 12/845,062, entitled "A MOBILE STRUCTURE HAVING SUFFICIENT INTERNAL STRUCTURAL RIGIDITY TO ELIMINATE NEED FOR LOAD-BEARING PERIMETER SUPPORT STRUCTURES," filed Jul. 28, 2010, which application is fully incorporated herein in its entirety by this reference, and which claims the benefit of and priority to U.S. Provisional Patent Application No. 61/271,925, titled "SUSTAINABLE, MOBILE, EXPANDABLE STRUCTURE," filed Jul. 28, 2009, which application is fully incorporated herein in its entirety by this reference.

FIELD OF THE INVENTION

The present invention generally relates to mobile structures, and more particularly to towable mobile structures having substantial living, working, and/or storage space.

BACKGROUND OF THE INVENTION

As used in this application, the term "mobile structure" is intended to encompass any structure, including a living, working, or storage area, that is mobile, i.e., capable of being pulled or towed (e.g., with a hitch). Thus, a "mobile structure," as the term is used herein, includes trailers, campers, recreational vehicles, mobile laboratories, and mobile medical units, among other things.

Mobile structures are typically inferior to more permanent structures. For example, mobile structures typically have less structural stability, fewer floor plan options, and smaller interior space.

To increase the usable interior space, some mobile structures expand when they arrive at their destination. For example, some mobile structures include pop-out rooms or slide-out rooms. However, the size, stability, and accessibility of such pop-out rooms and slide-out rooms is limited.

SUMMARY OF THE INVENTION

In mobile structure embodiments of the present invention a unique configuration of structural framing elements, including rigid frames and leveling assemblies provide, among other things, flexibility in floor plan options, ease of use, and structural stability while minimizing an amount of material used and accommodating expansions areas.

A first general aspect of the invention is a mobile structure with ample interior space unobstructed by structural members. The mobile structure includes: first and second rigid frames, each of the first and second rigid frames including: a first vertical support; a second vertical support substantially parallel to the first vertical support; and a lateral support extending perpendicularly at least from the first vertical support to the second vertical support; first and second horizontal roof supports, the first and second horizontal roof supports being supported by the first and second rigid frames, and being mutually parallel; a floor under the first and second horizontal roof supports; a wheel-axle assembly under the floor; and a first set of leveling assemblies that are extendable down from the floor, each leveling assembly being in weight-bearing and in-line relationship with respect to one of the vertical supports of the first rigid frame.

In a preferred embodiment, the leveling assemblies are extendable to support the mobile structure on a surface when the mobile structure is in a stationary mode, and are retractable from their extended configuration when the mobile structure is in a transport mode.

In another preferred embodiment, the first rigid frame further includes a lateral floor joist that is substantially parallel to the lateral support, and that extends at least from the first vertical support to the second vertical support.

In another preferred embodiment, the mobile structure further includes a hitch in towing relationship with the floor.

In a further preferred embodiment, the mobile structure further includes a hitch leveling assembly extendable down from the hitch.

In yet another preferred embodiment, the mobile structure further includes at least one vertical roof support extending up from the floor to support one of the horizontal roof supports.

In another preferred embodiment, the mobile structure further includes a second set of leveling assemblies that are extendable down from the floor, each leveling assembly of the second set of leveling assemblies being in weight-bearing and in-line relationship with respect to one of the vertical supports of the second rigid frame.

In another preferred embodiment, the mobile structure includes a first stabilizing frame disposed outside of a space between the first and second rigid frames, the first stabilizing frame supporting and longitudinally stabilizing the first and second horizontal roof supports, the first stabilizing frame having a first vertical roof support and a second vertical roof support substantially parallel to the first vertical roof support, and the first and second vertical roof supports being supported by the floor.

In a further preferred embodiment, the mobile structure includes a second stabilizing frame disposed outside of a space between the first and second rigid frames, and disposed in symmetric relationship with respect to the first stabilizing frame, the second stabilizing frame supporting and longitudinally stabilizing the first and second horizontal roof supports, the second stabilizing frame having a first vertical roof support and a second vertical roof support substantially parallel to the first vertical roof support, and the first and second vertical roof supports of the second stabilizing frame being supported by the floor.

In yet another preferred embodiment, the mobile structure further includes: an eave support assembly supported by the first and second horizontal roof supports, the eave support assembly including: a first longitudinal eave support; a second longitudinal eave support substantially parallel to the first longitudinal eave support; and a plurality of lateral eave supports each extending perpendicularly at least from the first longitudinal eave support to the second longitudinal eave support, the first and second longitudinal eave supports being separated from one another by a distance greater than a distance separating the first and second vertical supports of at least one of the first and second rigid frames.

In a further preferred embodiment, each of the first and second horizontal roof supports includes a truss, the truss including a bottom chord joined to the first and second rigid frames; a top chord disposed above and in parallel with the bottom chord, the top chord being joined to the eave support assembly; and truss members disposed in triangular patterns between the top and bottom truss chords.

In yet another preferred embodiment, an extension distance of at least one of the leveling assemblies of the first set of leveling assemblies is manually adjustable.

In yet another preferred embodiment, an extension distance of at least one of the leveling assemblies of the first set of leveling assemblies is automatically adjustable.

In another preferred embodiment, at least one of the leveling assemblies of the first set of leveling assemblies includes a base plate so as to distribute a load of the mobile structure over an area under the base plate.

In another preferred embodiment, each of the vertical supports of the first rigid frame extends through the floor and is joined in a weight-bearing and in-line relationship to a corresponding one of the leveling assemblies of the first set of leveling assemblies.

A second general aspect of the invention is a mobile structure with ample interior space unobstructed by structural members. The mobile structure includes: first and second rigid frames each including: a first vertical support; a second vertical support substantially parallel to the first vertical support; and a lateral rigid frame support extending at least from the first vertical support to the second vertical support. The mobile structure further includes: first and second horizontal roof supports, the first and second horizontal roof supports being supported by the first and second rigid frames, and being mutually parallel; a floor under the first and second horizontal roof supports, each of the vertical supports of the rigid frames extending through the floor; a wheel-axle assembly disposed under the floor, leveling assemblies that are extendable down from the floor, each leveling assembly being in weight-bearing and in-line relationship with respect to one of the vertical supports of the first and second rigid frames; a hitch in towing relationship with the floor, and an eave support assembly disposed above and supported by the first and second horizontal roof supports. The eave support assembly includes: a first longitudinal eave support; a second longitudinal eave support substantially parallel to the first longitudinal eave support; and a plurality of lateral eave supports each extending perpendicularly at least from the first longitudinal eave support to the second longitudinal eave support, the first and second longitudinal eave supports being separated from one another by a distance greater than a distance separating the first and second vertical supports of at least one of the first and second rigid frames.

In a preferred embodiment, the mobile structure includes: a first stabilizing frame disposed outside of a space between the first and second rigid frames, the first stabilizing frame supporting and longitudinally stabilizing the first and second horizontal roof supports, the first stabilizing frame having a first vertical roof support and a second vertical roof support substantially parallel to the first vertical roof support, and the first and second vertical roof supports being supported by the floor.

In another preferred embodiment, the mobile structure further includes: a second stabilizing frame disposed outside of a space between the first and second rigid frames, and disposed in symmetric relationship with respect to the first stabilizing frame, the second stabilizing frame supporting and longitudinally stabilizing the first and second horizontal roof supports, the second stabilizing frame having a first vertical roof support and a second vertical roof support substantially parallel to the first vertical roof support, and the first and second vertical roof supports of the second stabilizing frame being supported by the floor.

In another preferred embodiment, each of the first and second horizontal roof supports including a truss, the truss comprising: a bottom chord joined to the first and second rigid frames; a top chord disposed above and in parallel with the bottom chord, the top chord being joined to the eave support assembly; and truss members disposed in triangular patterns between the top and bottom truss chords.

In a further preferred embodiment, at least one of the first and second rigid frames further includes a lateral floor joist that is substantially parallel to the lateral support, and that extends at least from the first vertical support to the second vertical support.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The following description can be better understood in light of Figures, in which.

DETAILED DESCRIPTION

Reference will now be made to the figures wherein like structures will be provided with like reference designations. It is understood that the figures are diagrammatic and schematic representations of presently preferred embodiments of the invention, and are not limiting of the present invention, nor are they necessarily drawn to scale.

Embodiments of mobile structures described herein may provide, among other things, structural elements that provide rigidity and stability under heavy loads while enabling reconfiguration of the mobile structure into different modes of operation and permitting flexible floor plan options. Among the various structural elements is a plurality of rigid frames that use a minimal amount of material and preserve an open interior space while enhancing structural stability by effectively transferring lateral forces to leveling assemblies located directly under and in-line with vertical supports of the rigid frames. An eave support assembly also enhances structural stability by transferring internal and external loads to the rigid frames.

Figure 1:
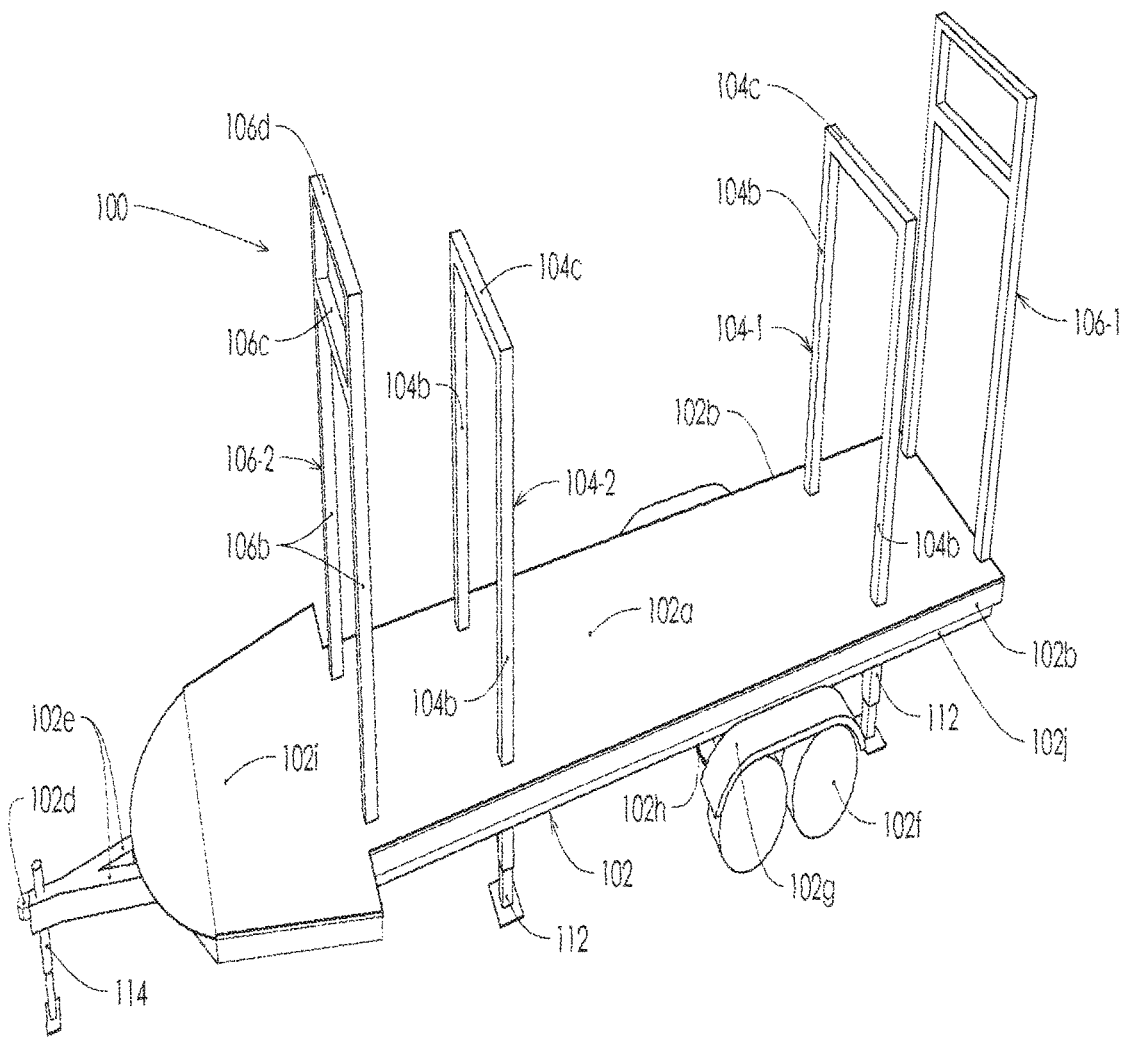
FIG. 1 is a perspective view of structural framing elements in an example embodiment of a mobile structure.
Figure 2:
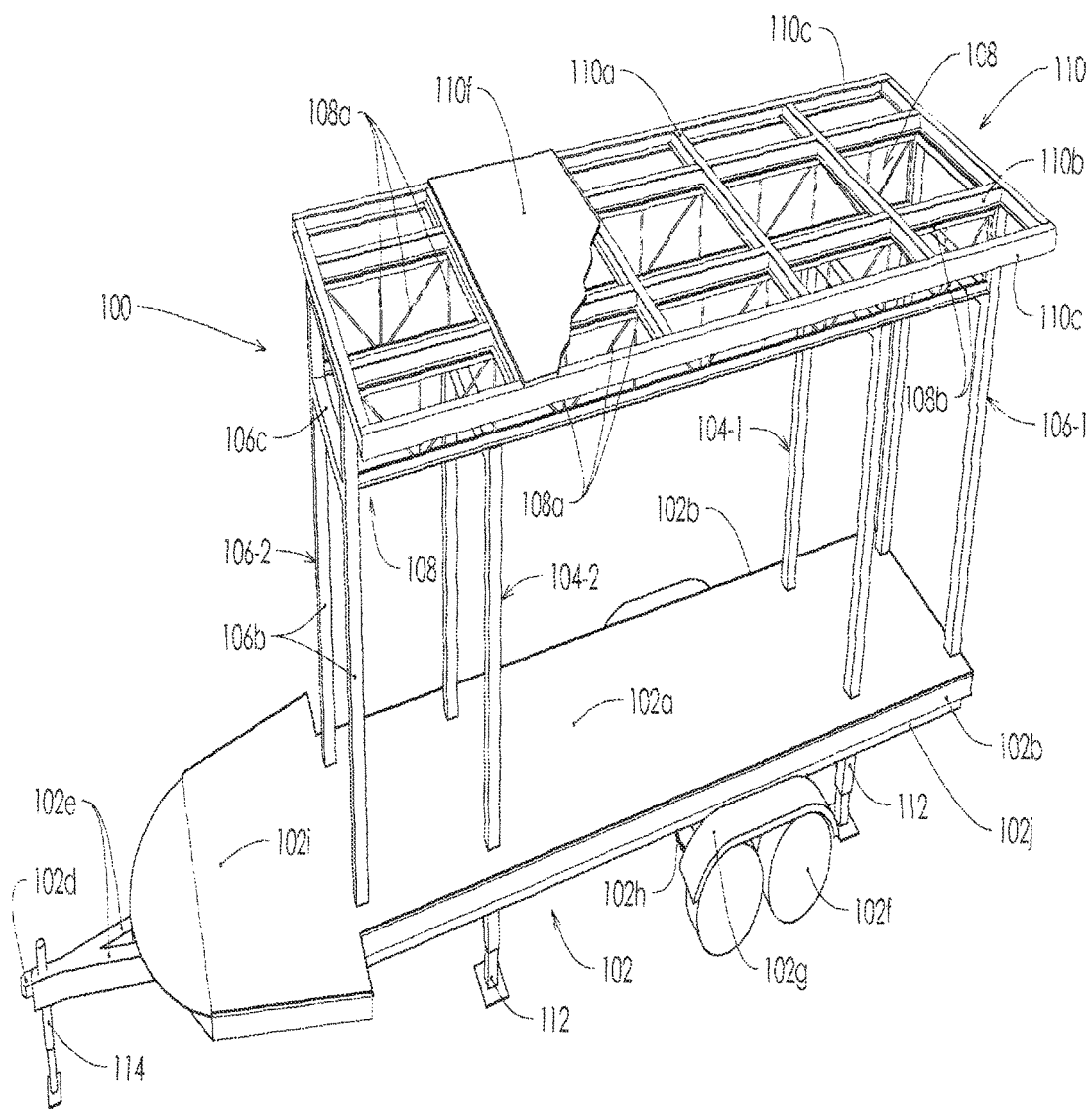
FIG. 2 is a perspective view of the mobile structure of FIG. 1 and shows additional structural framing elements.

FIGS. 1 and 2 show a perspective view of structural framing elements of an example embodiment 100 of a mobile structure. As depicted in FIG. 1, mobile structure 100 comprises various structural framing elements including, for example, a carriage assembly 102, rigid frames 104, stabilizing frames 106, primary leveling assemblies 112, and a secondary or hitch leveling assembly 114. FIG. 2 additionally shows horizontal roof supports 108 and an eave support assembly 110. Each of the foregoing elements and their relationship to one another are described below.

Mobile structure 100 is a lightweight structure capable of being conveniently airlifted, towed, and/or hauled to any desired location. Carriage assembly 102 provides means for mobile structure 100 to be conveniently towed with the aid of a motive force, such as a truck, and provides a base on which a working/living space of mobile structure 100 rests. Carriage assembly 102 includes a floor diaphragm (also referred to as "floor") 102a mounted to a plurality of transverse joists 102c (hidden from view by floor diaphragm 102a), which are in turn mounted to and disposed perpendicular to peripheral carriage longitudinal channels or beams 102b.

Carriage assembly 102 further includes a hitch 102d, angled neck beams 102e joined to carriage longitudinal beams 102b and meeting at hitch 102d, a wheel-axle assembly 102f mounted on an underside of floor diaphragm 102a, and a fender 102g mounted over wheels of wheel-axle assembly 102f. Wheel-axle assembly 102f may be mounted to longitudinal beams (depicted in FIG. 3 as carriage longitudinal beams 102j under floor diaphragm 102a) via a leaf spring suspension 102h. Floor diaphragm 102a may include or be joined to a tongue 102i coextensive therewith and extending outwardly toward hitch 102d.

Moreover, although wheel-axle assembly 102f is depicted as having two axles and four wheels, one of ordinary skill will appreciate that a different number of wheels and/or a different number of axles (e.g., one axle and a corresponding pair of two wheels) may be used as different wheel-axle assemblies' weight limits will permit. Moreover, although carriage assembly 102 is described as including various pieces or parts, a group of some or all of the parts may be formed as one integral piece. Conversely, one or more of the carriage assembly parts may be comprised of various subparts. Materials used to make the various parts of carriage assembly 102 may include any suitable materials including, for example, wood, metal (e.g., aluminum, steel), plastic, etc. and joints between parts may be of a type that is suitable for the material used including, for example, mortise and tenon joints or welded joints, etc. Fasteners for the joints may include bolts, nails, screws, rivets, adhesives, etc., as appropriate for the joint type.

Rigid frames 104 and stabilizing frames 106 are joined to and extend upward from carriage assembly 102 to support eave support assembly 110. Rigid frames 104 also bear lateral loads from wind or other external forces, transferring such forces to the ground via primary leveling assemblies 112. Although two rigid frames 104 are depicted, additional rigid frames may be included for increased support, particularly for embodiments of mobile structure 100 having relatively larger dimensions.

Rigid frames 104 include a rear rigid frame 104-1 proximate a rear end of mobile structure 100 and a front rigid frame 104-2 proximate a front end of mobile structure 100. Each of rigid frames 104 includes a lateral floor joist 104a (visible in FIG. 3), a pair of vertical supports 104b that run parallel to each other, and a lateral support 104c. All connections between components of rigid frames 104 are rigid connections, such as welded or bolted connections. By way of example and not limitation, vertical supports 104b may be separated from each other by a distance of about three to about five feet. Lateral support 104c and lateral floor beam 104a of each rigid frame extends at least from one vertical support 104b of the rigid frame to the other vertical support 104b of the rigid frame and, optionally, beyond the vertical supports.

Stabilizing frames 106 include a rear stabilizing frame 106-1 proximate a rear end of mobile structure 100 and a front stabilizing frame 106-2 proximate a front end of mobile structure 100. Each of stabilizing frames 106 supports and longitudinally stabilizes the first and second horizontal roof supports 108, among other things. Each of stabilizing frames 106 also includes a lateral floor joist 106a (not shown, but similar in position to later floor joists 104a depicted in FIG. 3 of rigid frames 104) and a pair of vertical roof supports 106b that run parallel to each other. Moreover, each of stabilizing frames 106 includes lateral supports 106c and 106d extending at least from one vertical roof support to the other vertical roof support of the stabilizing frame. All connections between components of stabilizing frames 106 are rigid connections, such as welded or bolted connections.

Rigid frames 104 are disposed centrally over carriage assembly 102 with respect to the more outwardly disposed stabilizing frames 106. Moreover, stabilizing frames 106 are disposed outside of a space between the first and second rigid frames, and in symmetric relationship with respect to each other. Thus, front stabilizing frame 106-2 and rear rigid frame 104-1 are disposed on opposite sides of and longitudinally in line with front rigid frame 104-2. Similarly, rear stabilizing frame 106-1 and front rigid frame 104-2 are disposed on opposite sides of and longitudinally in line with rear rigid frame 104-1. By way of example and not limitation, front and rear rigid frames 104 are spaced apart by a distance of about eight to about sixteen feet, to allow for flexible floor plan options and convenient passage to lateral extension areas that may be deployed in a stationary mode of mobile structure 100. A distance between rear stabilizing frame 106-1 and rear rigid frame 104-1, on the other hand, may be smaller, e.g., between about three and about eight feet but not limited to this range of dimensions. A distance between front stabilizing frame 106-2 and front rigid frame 104-2 may also be of the same or a similar distance (i.e., between about three and about eight feet but not limited to this range of dimensions).

Rigid frames 104 may include or may be joined directly to primary leveling assemblies 112. For example, in one embodiment, vertical supports 104b of each rigid frame extend through floor diaphragm 102a of carriage assembly 102 and integrally include primary leveling assemblies 112. Alternatively, each vertical support 104b may be sleeved within an upper component of a corresponding primary leveling assembly 112 to a depth of about four to eight inches (but not limited to this range). Vertical supports 104b may be welded and or bolted to primary leveling assemblies 112 in the sleeved configuration.

In another embodiment, primary leveling assemblies 112 are not joined directly to or integrally part of vertical supports 104b but each is instead mounted to a beam or support on an underside of floor diaphragm 102a in weight-bearing and in-line relationship with a corresponding one of vertical supports 104b. In either embodiment, however, a load transferring effect is similar-loads bearing on vertical supports 104b of each rigid frame are transferred to the ground via primary leveling assemblies 112 without introducing extraneous torsion on any beams or supports of carriage assembly 102.

Primary leveling assemblies 112 are extendable away from the underside of floor diaphragm 102a when configuring mobile structure 100 in its stationary mode. Primary leveling assemblies 112 may be extended long enough to raise the wheels of mobile structure 100 off the ground or so the wheels just touch the ground or in some instances the wheels may add substantial support to the structure. An amount of extension is continuously or discretely variable to accommodate grade elevation variations of a surface on which mobile structure 100 is deployed. Moreover, primary leveling assemblies 112 may include jacks that are manually or automatically extendable and base plates or pads at distal ends thereof to distribute a load of the mobile structure over an area under the base plate. Secondary leveling assembly 114, located proximate hitch 102*d*, is similar in function to primary leveling assemblies 112, but will typically not need to bear as much weight and may therefore have a lower weight limit rating than primary leveling assemblies 112.

As depicted in FIG. 2, horizontal roof supports 108 are disposed above floor diaphragm 102*a* and are joined to rigid frames 104 in a perpendicular relationship with respect to vertical supports 104*b* and lateral supports/beams 104*a*/104*c* of each rigid frame. Horizontal roof supports 108 may include web tension and compression members 108*a* (also called truss members) and top and bottom chords 108*b*. As depicted, web tension and compression members 108*a* are disposed in triangular patterns. Horizontal roof supports 108 are joined (e.g., by bolting or welding) to rigid frames 104 at the intersection of vertical supports 104*b* and lateral supports 104*c*.

Horizontal roof supports 108 stabilize the position of each rigid frame 104 with respect to each another and transfer uplift or compression forces generated by lateral loads into vertical supports 104*b*. Thus, horizontal roof supports 108 provide rigidity to the overall frame of mobile structure 100. For example, without horizontal roof supports 108 rigid frames 104, when subjected to sufficiently strong forces, could buckle or fold. Moreover, distal ends of horizontal roof supports 108 are restrained by vertical roof supports 106*b* of stabilizing frames 106 to resist external lateral forces in addition to gravity loads. Furthermore, by locating horizontal roof supports 108 in an overhead assembly instead of in walls of mobile structure 100 or some other area that limits floor plan flexibility, open passages are preserved on the sides of mobile structure 100 for use with lateral extension areas.

As further depicted in FIG. 2, eave support assembly 110 positioned and supported above horizontal roof supports 108 includes lateral eave supports 110*a*, longitudinal stiffeners 110*b*, longitudinal eave supports 110*c*, and a roof diaphragm 110*f*. Eave support assembly 110 provides a base roof structure that is used to transfer roof diaphragm loads to horizontal roof supports 108 and to rigid frames 104 and 106 whether or not additional roof framing, such as sloped rafters, are utilized.

Lateral eave supports 110*b* are arranged in a parallel relationship and are rigidly joined to horizontal roof supports 108. Longitudinal stiffeners 110*b* are also arranged in a parallel relationship with respect to each other, but perpendicular to lateral eave supports 110*a* to provide overturning stability to lateral eave supports 110*a*.

An on center spacing of lateral eave supports 110*a* may be, but is not limited to, a dimension of about two feet to about six feet. Moreover, if sloped rafters (or other framing systems) are used they may be supported by eave support assembly 110 and roof diaphragm 110*f* may be fastened to such sloped rafters (or the like) instead of directly to eave support assembly 110 members 110*a*, 110*b*, and 110*c*, as depicted.

Longitudinal eave supports 110*c* are arranged in a parallel relationship with respect to each other and with respect to longitudinal stiffeners 110*b*. Longitudinal eave supports 110*c* provide a means to transfer shear forces from roof diaphragm 110*f* and are supported in a cantilevered method by the distal ends of lateral eave supports 110*a* providing structural flexibility. Longitudinal eave supports 110*c* are also joined to and support eaves of a roof (not shown) for mobile structure 100. A distance between longitudinal eave supports 110*c* may be between about six and about ten feet but not limited to this range of dimensions. For example, this distance may vary in accordance with an expected load placed on eave support assembly 110 and/or to accommodate a peaked roof having a desired slope.

Because rigid frames 104 can, in certain embodiments of mobile structure 100, fully support a roof, stabilizing frames 106 or portions thereof may optionally be omitted in those embodiments. Moreover, rigid frames 104 may be positioned in locations other than those depicted. For example, in one alternative embodiment stabilizing frames 106 may be omitted and rigid frames 104 may be moved, along with primary leveling assemblies 112, to the spaces occupied by stabilizing frames 106. In this alternative embodiment, vertical supports 104*b* of rigid frames 104 (relocated to outer positions) extend at least partially past lateral supports 104*c* to restrain movement of horizontal roof supports 108 in a longitudinal direction.

In another alternative embodiment, rear rigid frame 104-1 and its corresponding set of primary leveling assemblies 112 are omitted. In this embodiment, front rigid frame 104-1 and its corresponding set of primary leveling assemblies 112 may be moved toward the front or the rear, as appropriate, to compensate for the omission of rear rigid frame 104-1. Moreover, in a deployed configuration, this alternative embodiment of mobile structure 100 may be configured to rest on wheels of wheel-axle assembly 102*f* in addition to primary and secondary leveling assemblies 112 and 114.

In a further modification of the immediately foregoing alternative embodiment, front rigid frame 104-1 has a structure similar to stabilizing frames 106. More specifically, vertical supports 104*b* of front rigid frame 104-1 may extend past bottom chords 108*b* of horizontal roof supports 108 and an additional lateral support may be included above lateral support 104*c*. Accordingly, horizontal roof supports 108 in this embodiment are segmented and face-mounted on either side of the modified front rigid frame 104-1, thus forming a pair of trusses on each side of front rigid frame 104-1 (i.e., a total of four trusses).

In another alternative embodiment, a single beam, such as an I-beam or a rectangular or square cross-section beam, is used on each lateral side of mobile structure 100 as horizontal roof supports 108. A beam is typically heavier and stronger, all else being equal, than an open-web truss and, therefore, use of beams for horizontal roof supports 108 may be appropriate in (but not limited to) circumstances in which weight restrictions are more liberal and/or in which larger external forces are expected.

Figure 3:
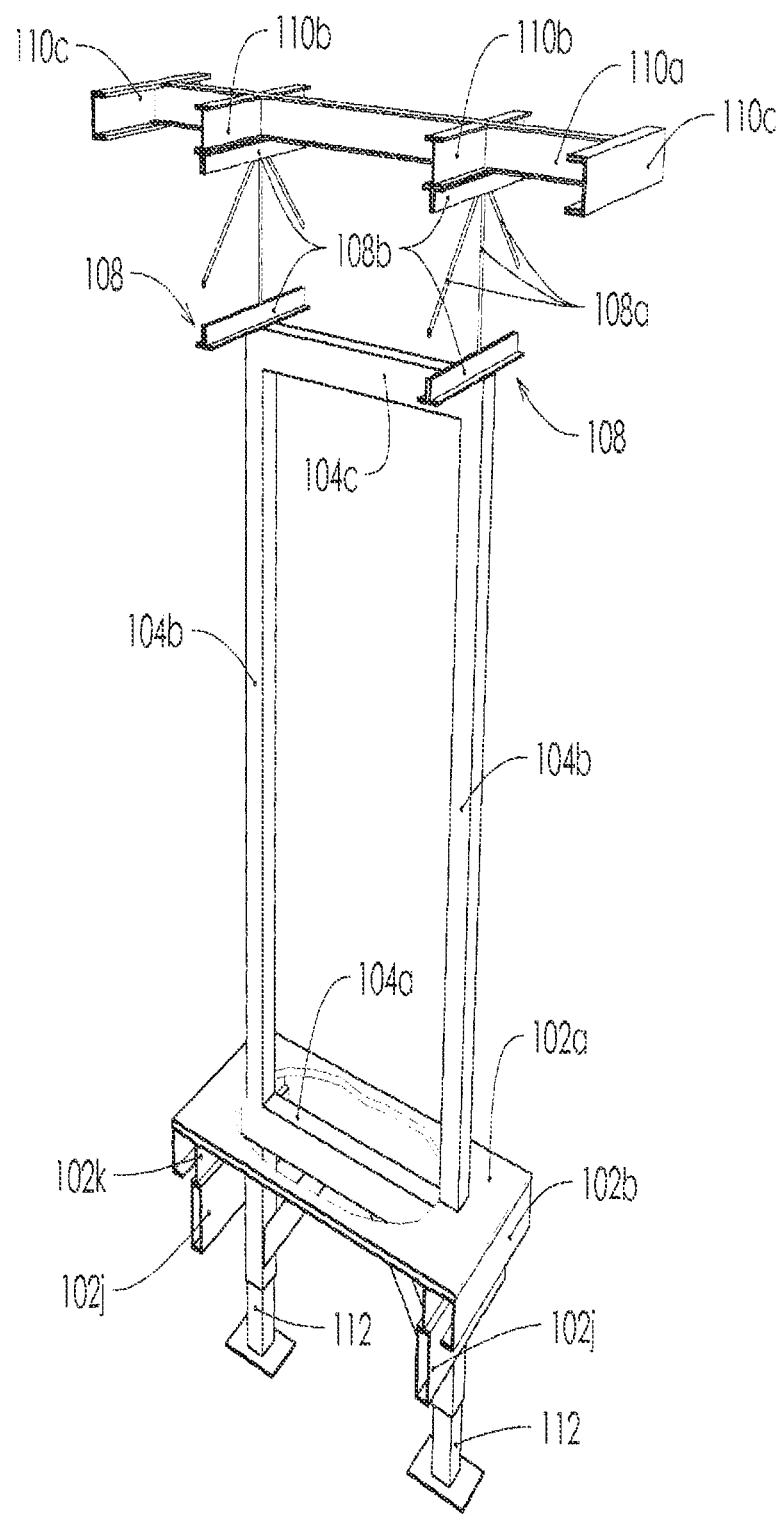
FIG. 3 is a cross-section perspective view of the mobile structure of FIG. 2.

FIG. 3 depicts a cross-section perspective view of one of rigid frames 104 of mobile structure 100 and its surrounding structural elements. Peripheral carriage longitudinal channels 102*b* are supported by cantilever from transverse joists 102*c* (hidden from view by floor diaphragm 102*a*) over interior carriage longitudinal beams 102*j*. Longitudinal stiffeners 102*k* provide stability from overturning of transverse joists 102*c*. Interior carriage longitudinal beams 102*j* support wheel-axle assembly 102*f*, and are joined (e.g., via a rigid connection) under floor diaphragm 102*a* to outer sides of vertical supports 104*b* of rigid frames 104. Floor diaphragm 102*a*, transverse joists 102*c*, peripheral carriage longitudinal beams 102b, and longitudinal stiffeners 102k work in conjunction to transfer floor loads back to rigid frames 104, which in turn transfer the floor loads to a ground surface via primary leveling assemblies 112. Floor loads are transferred to rigid frames 104 at least partially through fasteners (e.g., nails, bolts, or screws) that join floor diaphragm 102a to a top side of lateral floor joists 104a of rigid frames 104. Similar fasteners may also join floor diaphragm 102a to lateral floor joists 106a of stabilizing frames 106 and to transverse joists 102c of carriage assembly 102.

Horizontal roof supports 108, including tension and compression members 108a and top and bottom chords 108b, are also visible in FIG. 3. Although tension and compression members 108a appear to be floating and disconnected from any adjoining structure, this appearance is an artifact due to the limitations of a cross-sectional view. As shown in FIG. 2, tension and compression members 108a are actually formed in triangular patterns and span from one end of horizontal roof supports 108 to the other.

As described above with respect to carriage assembly 102, any suitable materials may be used to make the various parts of rigid frames 104, stabilizing frames 106, horizontal roof supports 108, eave support assembly 110, and primary and secondary leveling assemblies 112 and 114. In addition, various shapes and configurations of materials may be used for the structural framing elements. For example, I-beams, L-beams, C-beams, hollow rectangular or square cross-section beams, solid rectangular or square cross-section beams, or any combination thereof may be used for horizontally, vertically, and/or diagonally oriented supports, beams, or joists. Moreover, parts may be joined by any joint type appropriate for the materials being joined including, e.g., welded joints or mortise and tenon joints, and any suitable joint fasteners may be used, such as bolts, nails, screws, rivets, adhesives, etc.

U.S. Provisional Patent Application No. 61/271,925, entitled "SUSTAINABLE, MOBILE, EXPANDABLE STRUCTURE," filed Jul. 28, 2009, describes and depicts a finished mobile structure that uses the structural elements of mobile structure 100 described above. The description in the foregoing provisional application also describes in detail foldable wall panel assemblies that are joined to peripheral carriage longitudinal channels 102b and foldable roof panel assemblies that are joined to fixed roof panels, which are in turn joined to eave support assembly 110. The foldable wall panel assemblies and foldable roof panel assemblies may be joined via hinged joints to structural elements or to other elements mounted on the structural elements depicted in FIG. 2. In an expanded mode of mobile structure 100 the foldable wall panel assemblies and foldable roof panel assemblies are unfolded or extended to create expansion sections on lateral sides of mobile structure 100. However, embodiments of the present invention are not limited to expandable mobile structures of the type described in the above-referenced provisional application. For example, mobile structures built in accordance with the principles described above may have permanently fixed wall and roof panels that do not expand or retract from a central body.

The present invention may be embodied in other specific forms without departing from its spirit or essential characteristics. Therefore, the described embodiments are to be considered in all respects only as illustrative and not restrictive. Moreover, the scope of the invention is indicated by the appended claims rather than by the foregoing description. All changes which come within the meaning and range of equivalency of the claims are to be embraced within their scope.

What is claimed is:

1. A mobile structure with ample interior space unobstructed by structural members, the mobile structure comprising:
    first and second rigid frames each including:
        a first vertical support;
        a second vertical support substantially parallel to the first vertical support; and
        a lateral rigid frame support extending at least from the first vertical support to the second vertical support;
    first and second horizontal roof supports, the first and second horizontal roof supports being supported by the first and second rigid frames, and being mutually parallel;
    a floor under the first and second horizontal roof supports, each of the vertical supports of the rigid frames extending through the floor;
    a wheel-axle assembly disposed under the floor,
    leveling assemblies that are extendable down from the floor, each leveling assembly being in weight-bearing and in-line relationship with respect to one of the vertical supports of the first and second rigid frames;
    a hitch in towing relationship with the floor; and
    an eave support assembly disposed above and supported by the first and second horizontal roof supports, the eave support assembly including:
        a first longitudinal eave support;
        a second longitudinal eave support substantially parallel to the first longitudinal eave support; and
    a plurality of lateral eave supports each extending perpendicularly at least from the first longitudinal eave support to the second longitudinal eave support,
    the first and second longitudinal eave supports being separated from one another by a distance greater than a distance separating the first and second vertical supports of at least one of the first and second rigid frames.

2. The mobile structure of claim 1, further comprising:
    a first stabilizing frame disposed outside of a space between the first and second rigid frames,
    the first stabilizing frame supporting and longitudinally stabilizing the first and second horizontal roof supports, the first stabilizing frame having a first vertical roof support and a second vertical roof support substantially parallel to the first vertical roof support, and
    the first and second vertical roof supports being supported by the floor.

3. The mobile structure of claim 2, further comprising:
    a second stabilizing frame disposed outside of a space between the first and second rigid frames, and disposed in symmetric relationship with respect to the first stabilizing frame,
    the second stabilizing frame supporting and longitudinally stabilizing the first and second horizontal roof supports,
    the second stabilizing frame having a first vertical roof support and a second vertical roof support substantially parallel to the first vertical roof support, and
    the first and second vertical roof supports of the second stabilizing frame being supported by the floor.

4. The mobile structure of claim 1, each of the first and second horizontal roof supports including a truss, the truss comprising:
    a bottom chord joined to the first and second rigid frames;
    a top chord disposed above and in parallel with the bottom chord, the top chord being joined to the eave support assembly; and truss members disposed in triangular patterns between the top and bottom truss chords.

5. The mobile structure of claim 1, wherein at least one of the first and second rigid frames further includes a lateral floor joist that is substantially parallel to the lateral support, and that extends at least from the first vertical support to the second vertical support.

\* \* \* \* \*